United States Patent
Ko (10) Patent No.: US 8,029,173 B2
(45) Date of Patent: Oct. 4, 2011

(54) STRUCTURE OF OVERHEAD LAMP AND MOUNTING BRACKET FOR CONSTRUCTIONAL VEHICLE

(75) Inventor: In-Hong Ko, Seoul (KR)

(73) Assignee: Wookang Tech Co., Ltd., Cheongcheon-Dong, Bupyeong-Gu, Icheon-Si (KR)

( * ) Notice: Subject to any disclaimer, the term of this patent is extended or adjusted under 35 U.S.C. 154(b) by 129 days.

(21) Appl. No.: 12/379,629

(22) Filed: Feb. 26, 2009

(65) Prior Publication Data
US 2010/0172132 A1    Jul. 8, 2010

(30) Foreign Application Priority Data
Jan. 8, 2009  (KR) .................. 20-2009-0000241 U (51) Int. Cl.
*F21S 8/00* (2006.01)
(52) U.S. Cl. ........................ 362/427; 362/479
(58) Field of Classification Search .................. 362/418, 362/427, 362, 370–372, 459, 479, 485, 493, 362/487, 430, 432, 368, 382; 296/215; 248/309.1
See application file for complete search history.

(56) References Cited

U.S. PATENT DOCUMENTS

| | | | | |
|---|---|---|---|---|
| 4,987,522 A * | 1/1991 | Miyano et al. | ................ | 362/485 |
| 6,036,337 A * | 3/2000 | Belfer | ........................... | 362/287 |
| 6,264,354 B1 * | 7/2001 | Motilal | ........................ | 362/505 |
| 2002/0075690 A1* | 6/2002 | Mullen | ........................ | 362/427 |
| 2003/0007354 A1* | 1/2003 | Schubert et al. | ............... | 362/285 |
| 2004/0252520 A1* | 12/2004 | Martineau et al. | ............ | 362/545 |
| 2005/0281038 A1* | 12/2005 | Burton | ......................... | 362/382 |
| 2007/0058377 A1* | 3/2007 | Zampini et al. | ............... | 362/372 |

* cited by examiner

*Primary Examiner* — Julie A Shallenberger
(74) *Attorney, Agent, or Firm* — GWiPS (57) ABSTRACT

A structure of overhead lamp and mounting bracket for constructional vehicle has developed to tilt the illuminating angle by controlling the position of slits at the lateral sides of bracket. The lamp is securely fixing at the controlled position at one of 4 positions and the position controlling slits. The main case is securely fixed to the bracket by installing a connection screw and a hinge bolt for restricting unwanted rotation of the hinge bolt. Accordingly, since a position controlling rib having a position controlling slit is extended rearward from side supporters, the illumination angle can be controlled within a greater range. The main case can be supported at 4 points through the plurality of position controlling slits. Furthermore, by fitting the connection screw with an outer circumferential recess of a hinge bolt fastening lever, rotational separation of the hinge bolt and change of the illumination angle of the main case can be prevented.

8 Claims, 6 Drawing Sheets

STRUCTURE OF OVERHEAD LAMP AND MOUNTING BRACKET FOR CONSTRUCTIONAL VEHICLE

BACKGROUND OF THE INVENTION

1. Field of the Invention

The present invention relates to the structure of overhead lamp and mounting bracket for constructional vehicle. More particularly, the overhead lamp with mounting bracket installed on a roof of the constructional vehicle has capable to control the illuminating direction by adjusting the tilt angle. A pair of arc-slits disposed at lateral surfaces of the mounting bracket has adopted for tiling and securely fixing the lamp at a controlled position.

2. Description of the Related Art

As generally known, a constructional vehicle has equipped with a pair of overhead lamps to secure the front views, while the vehicle is operating at night or in a dark place such as a tunnel. The overhead lamp has assembled with a lamp chamber consisted a main housing and a transparent cover, sub-housing consisted lens and reflecting mirror and mounted in the lamp chamber, and a head-lamp unit mounted in the sub-housing.

The overhead lamp unit comprises a bulb as a light source, and a bulb adaptor that supports the bulb. For the bulb, the halogen bulb is generally used for adopting temperature radiation system. Alternatively, a gas discharge bulb is adopted a luminescence system.

The halogen bulb is relatively darker than the gas discharge bulb since it has a low luminous flux, but is cheaper and therefore generally applied to mid and low-end cars. On the other hand, although being expensive, the gas discharge bulb is even brighter than the halogen bulb since having a high luminous flux, and therefore is generally applied to high price cars.

Recently, researches for headlamp assemblies using an LED lamp as the light source have been actively performed.

Especially, the LED lamp is advantageous in terms of general aspects including a processing rate, power consumption and the lifespan owing to its properties as a semiconductor, and therefore has been widely used as an electronic indication part in various electronic appliances. Furthermore, as high-brightness LEDs are introduced recently, the LED lamp has been spotlighted as a high-tech future light source. The LED lamp is not only power-saving in comparison with other conventional bulbs, but also achieves excellent color rendering in comparison with conventional color lighting using glasswork, coating, a filter and so on, since having elements of a variety of colors. In addition, the LED lamp has a great durability. Therefore, the maintenance cost and the replacement cost for the vehicle headlamp assembly can be reduced.

Figure 1:
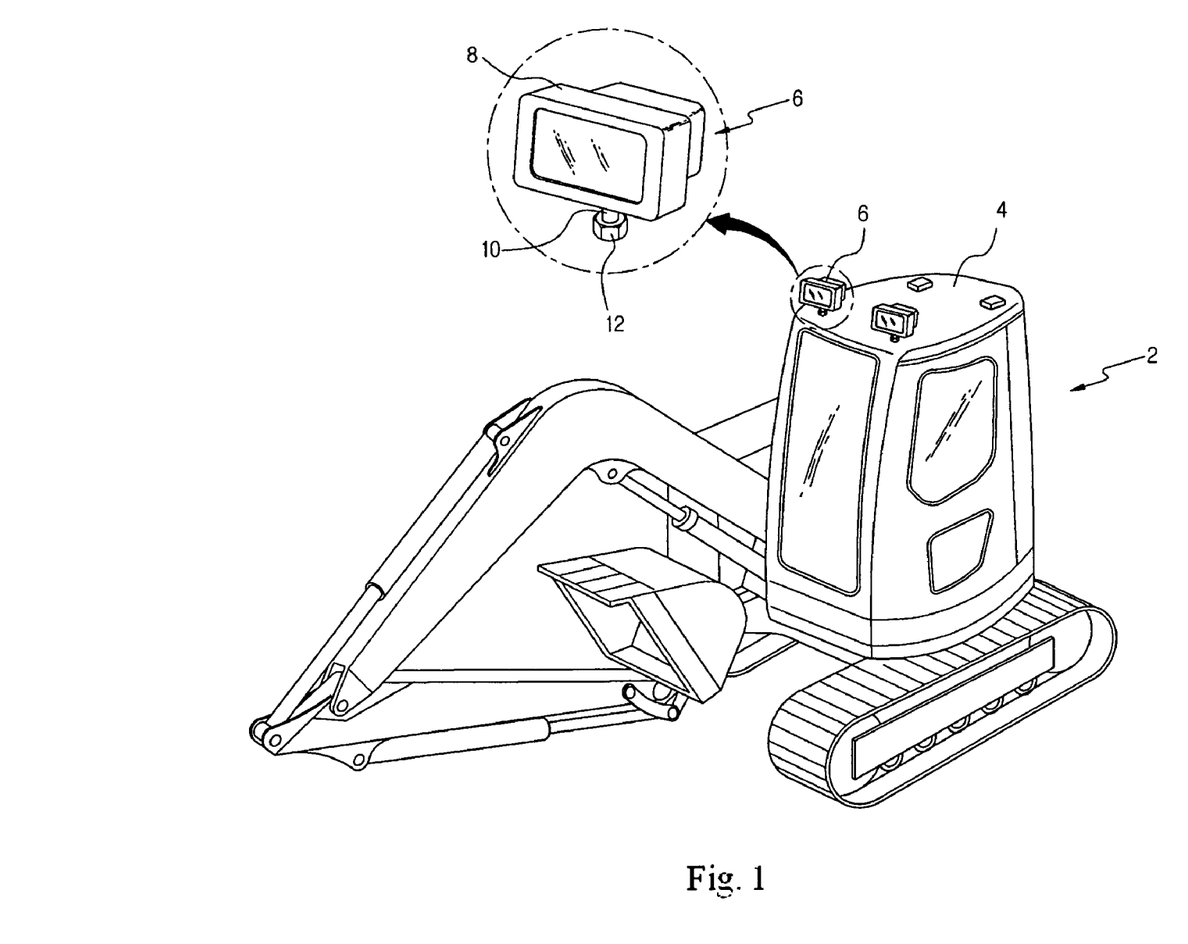
FIG. 1 is a perspective view showing an overhead lamp fixed on a roof of the heavy-equipment or constructional vehicle.

FIG. 1 is a perspective view showing a pair of overhead lamps mounted on a heavy equipment or constructional vehicle.

Referring to FIG. 1, since the overhead lamp has a high brightness and excellent durability as described above, the LED lamp is generally used to a heavy equipment vehicle 2 in a constructional site, that is a poor environment, or an off-road vehicle (not shown) such as a jeep.

FIG. 1 shows the heavy equipment vehicle 2 mounted with a lamp apparatus 6 at an upper surface of a roof panel 4 thereof. The appearance of the lamp apparatus 6 is constituted by a hexahedral case 8. In the center of a lower surface of the case 8, a fixed rod 10 is fixed to the roof panel 4, being equipped with a connection bolt 12 at a lower end thereof.

The conventional lamp apparatus 6 is immovably fixed to the upper surface of the roof panel 4. However, it is disadvantageous to fix the lamp apparatus 6 to the roof panel 4 in an angle-uncontrollable state because the lamp apparatus 6 would illuminate different positions according to the working positions by the heavy equipment vehicle 2.

For example, more specifically, in case of excavating the ground or a wall, the lamp apparatus 6 needs to have totally different illumination angles to adequately function. That is, when the lamp apparatus 6 is immovably fixed to the upper surface of the roof panel 4, the working areas can not be properly illuminated.

Figure 2:
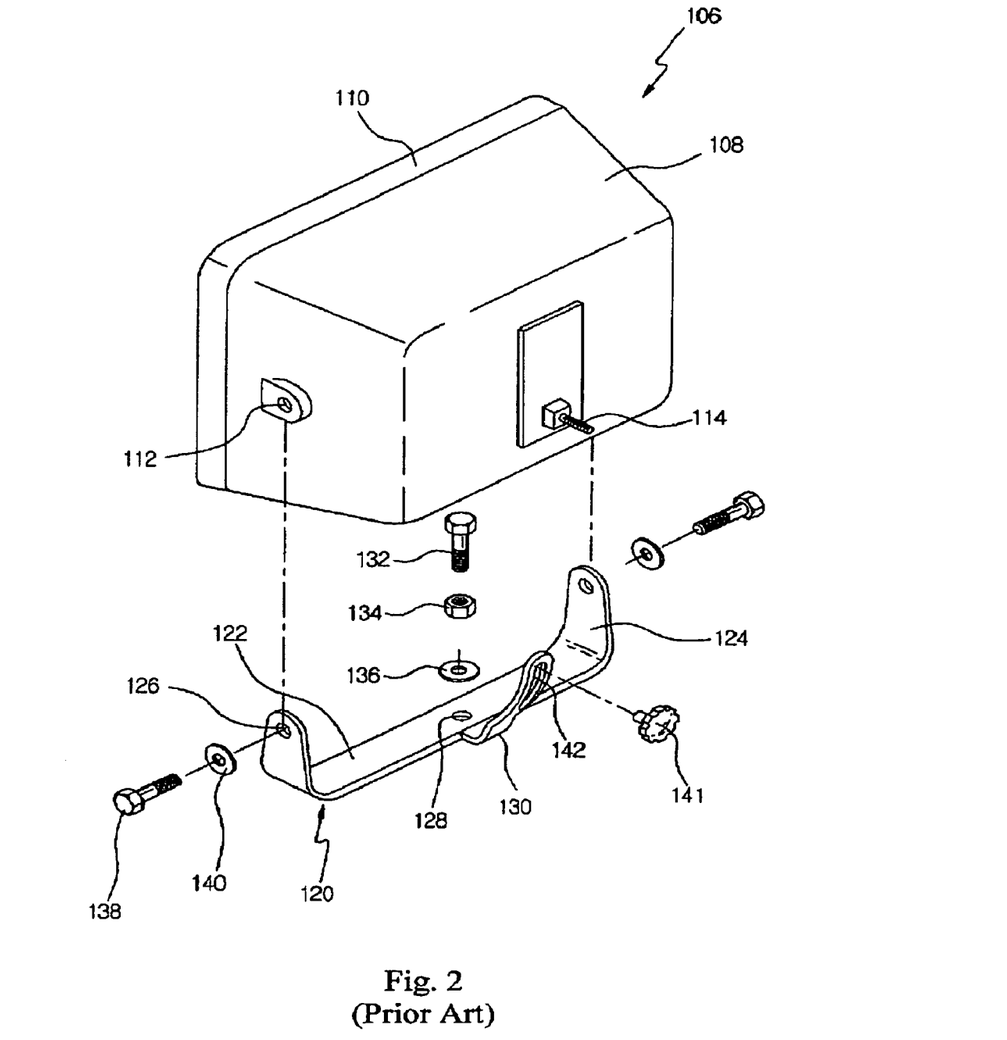
FIG. 2 is an exploded perspective view of a conventional overhead lamp and supporting structure.
Figure 3:
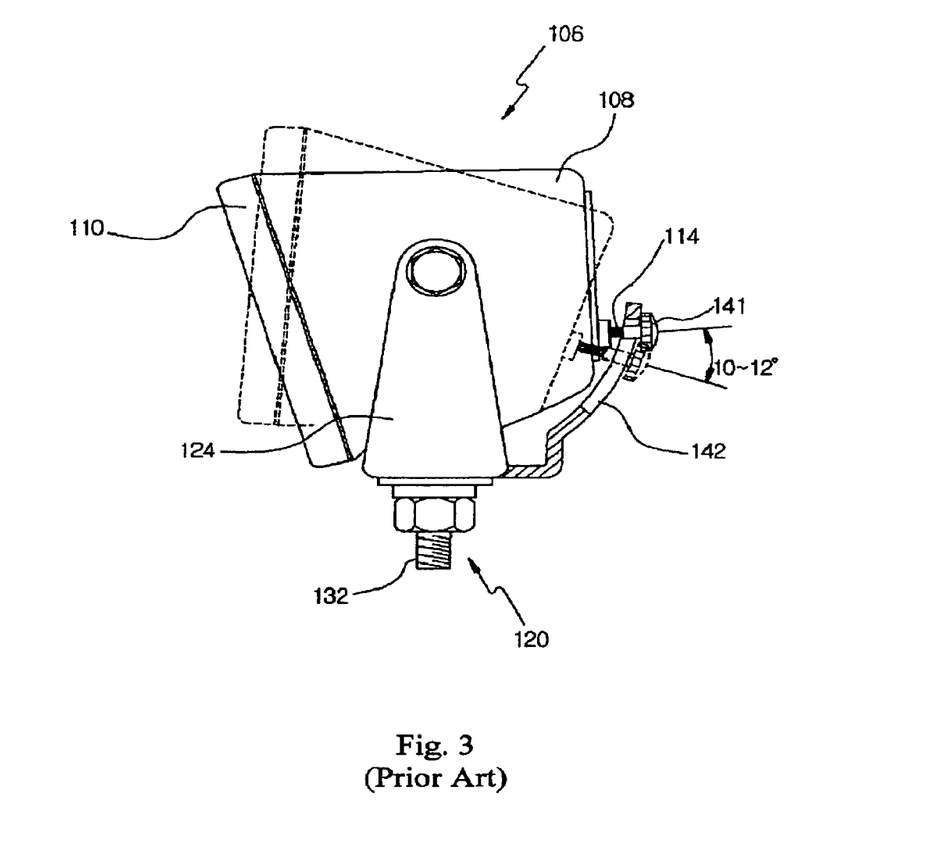
FIG. 3 is a side view of the overhead lamp and supporting structure of FIG. 2, showing an illumination angle range.

Accordingly, a structure for supporting a lamp apparatus has recently been developed as shown in FIGS. 2 and 3.

FIG. 2 is an exploded perspective view of the lamp apparatus supporting structure for a vehicle according to another conventional art. FIG. 3 is a side view of the lamp apparatus supporting structure of FIG. 2, showing an illumination angle range.

Referring to the drawings, another conventional lamp and supporting structure, a lamp apparatus 106 comprises a main case 108 equipped with a plurality of LED lamps (not shown) mounted therein. The main case 108 includes a connection hole 112 on both sides, and a front cover 110 at the front. In addition, a connection protrusion 114 is formed on a lower rear surface of the main case 108.

The main case 108 is fixed to the roof panel 4 of the heavy equipment vehicle 2, and a fixing unit 120 for controlling the illumination angle is additionally provided. The fixing unit 120 comprises a center supporter 122 fixed to the roof panel 4 apart from a lower part of the main case 108, and side supporters 124 vertically extended upward from both ends of the center supporter 122 and brought into close contact with lateral sides of the main case 108. A hinge hole 126 is formed at each side supporter 124, corresponding to the connection hole 112.

The center supporter 122 has a penetration hole 218 substantially in the middle. In addition, a position determining rib 130 is extended from a rear side of the center supporter 122 as seen from the front to the rear of the vehicle. More specifically, the position determining rib 130 is bent in a regular arc form upward from the center supporter 122, and includes a position determining slit 142 formed in a length direction thereof.

A washer 136, a nut 134 and a fixing bolt 132 are sequentially connected through the penetration hole 128 of the center supporter 122, thereby connecting the center supporter 122 to the upper surface of the roof panel 4 (FIG. 1).

In a state where the connection holes 112 formed on the main case 108 and the hinge holes 126 formed on the side supporter 124 are correspondingly connected to each other, a washer 140 and a hinge bolt 138 are sequentially connected to the connection holes 112 through the hinge holes 126. Therefore, the main case 108 is rotationally hinged on the fixing unit 120.

Next, when the connection protrusion 114 of the main case 108 is engaged with the position determining slit 142 of the position determining rib 130 formed at the fixing unit 120 and a position fixing lever 141 is connected to the connection protrusion 114, the main case 108 can be rotated with respect to the fixing unit 120 fixed to the roof panel 4 of the vehicle. Accordingly, the illumination angle of the LED lamps (not shown) provided in the main case 108 can become controllable as shown in FIG. 3.

According to the above-described conventional lamp apparatus supporting structure for a vehicle, however, since a displacement range of the illumination angle of the main case 108 is restricted within the length of the position determining slit 132, the actual illumination angle is approximately 10~12 degrees as shown in FIG. 3.

Moreover, since the conventional lamp apparatus supporting structure is supported by 3 points, that is, both sides of the main case 108 and the connection protrusion 114 formed at the rear middle part of the main case 108, it is difficult to securely fix the main case 108 with respect to the fixing unit 120. More specifically, while the heavy equipment vehicle 2 is moving to work in such a poor work environment, the position fixing lever 141 fixed merely by one position may be unfastened, thereby hindering the normal performance of the lamp apparatus.

Meanwhile, considering that the conventional lamp apparatus supporting structure is mainly applied to the heavy equipment vehicle which works at a poor environment such as a construction site generating much vibration with an uncompleted underground construction, the hinge bolt 138 would be transmitted with the vibration of the vehicle and easily separated from the connection hole 112 of the main case 108. As a result, unwanted change of the illumination angle of the lamp apparatus 6 may be caused.

SUMMARY OF THE INVENTION

Accordingly, the present invention has been made in view of the above problems, and it is an object of the present invention to provide a supporting structure for an overhead lamp for constructional vehicle, capable of increasing an illumination angle range by forming position controlling slits at lateral sides of a bracket, more securely fixing a main case of the lamp apparatus as position-controlled by supporting the main case through 4 points using a plurality of hinges and a plurality of the position controlling slits, and also securely fixing the main case to the bracket by connecting a connection screw that fixes a hinge bolt, restricting undesired rotation of the hinge bolt.

In accordance with the present invention, the above and other objects can be accomplished by the provision of a structure for supporting a lamp apparatus including a plurality of LED lamps mounted in a main case, a lamp PCB mounted with parts and sockets for operating the LED lamps, a collimate lens connected to a front side of the LED lamps to reflect light by a predetermined angle, a protection board formed at the front side of the collimate lens to protect the LED lamps from contaminants, a cover covering the protection board, being connected to the front of the main case, and a packing material interposed between the cover and the main case, the lamp apparatus supporting system comprising the main case (208) assembled with many different lamp parts, has four point supporting system for tilting and fixing, wherein the main case (208) is tilt-able with respect to a pivot point (222) and fix-able with respect to a fastening nut (224). The pivot point (222) and the fastening nut (224) are integrally formed on an arc-strip (270) disposed at a center of both lateral sides of the main case (208). A mounting unit (226) has a bolt hole (232) and an arch-shaped slot (236) for passing through bolts. The main case (208) is installed to the mounting unit (226) for mounting on a roof panel (4) of a heavy equipment vehicle (2). A knob-shaped fastener (240) has formed a thread (242) on the front bolt portion thereof for inserting into the pivot point (222). A fastening bolt (250) is inserted into the fastening nut (224) to fix an illumination angle after adjusting the main case (208) by sliding along with the arch-shaped slot (236).

The main case (208) consists of a plurality of the heat emitting fins (225) formed on the outer surfaces of the main case (208) to increase the heat emitting surfaces. The main case (208) is made of a high-conductivity material, such as aluminum. The mounting unit (226) is comprised of a center supporter (228) mounted on the roof panel (4) of the vehicle (2), and a pair of the lateral supporters (230), which are perpendicular to the center supporter (228) for installing the main case (208) by matching the bolt holes (232) to the pivot points (222). A tilt calibrator (234) is formed rearward of the arch-shaped slot (236) on both sides of the lateral supporters (230). The center supporter (228) has a mounting bolt (238), which is forming a male thread (238a) on the front portion for mounting on the roof panel (4), and a set of the fastening nuts (238b).

The arch-shaped slot (236) is formed by cutting-out both of the lateral supporters (230) having a quarter circular lengths. Therefore, the main case (208) is able to tilt up to 90 degrees for illuminating by sliding through the arch-shaped slot (236).

The knob-shaped fastener (240) has further included a stop-bolt (260) inserted into an install hole (230a) on the mounting unit (226) for contacting to a recess (240a) of the knob-shaped fastener (240) to prevent free rotation and loosening-off the knob-shaped fastener (240).

The mounting unit (226) has formed a U-share to install the main case (208) between the pair of the lateral supporters (230). The heat emitting fins (225) are integrally formed at top surface, lower surface and rear surface of the main case (208) suitable for heat venting.

According to the lamp apparatus supporting structure for a vehicle as described above, the illumination angle of the lamp apparatus can be increased since the position controlling rib having the position controlling slit is extended to the rear side of the lateral sides of the side supporters and also provided at both sides of the fixing unit. Moreover, the main case is fixed to the fixing unit through a plurality of the position controlling slits that is, supported by 4 points, thereby being more securely fixed. Also, by fitting the connection screw with any one circumferential recess of the hinge bolt fastening lever, undesired separation of the hinge bolt and undesired change of the illumination angle of the main case can be prevented.

DETAILED DESCRIPTION OF THE PREFERRED EMBODIMENTS

Hereinafter, an exemplary embodiment of the present invention will be described in detail with reference to the accompanying drawings.

Figure 4:
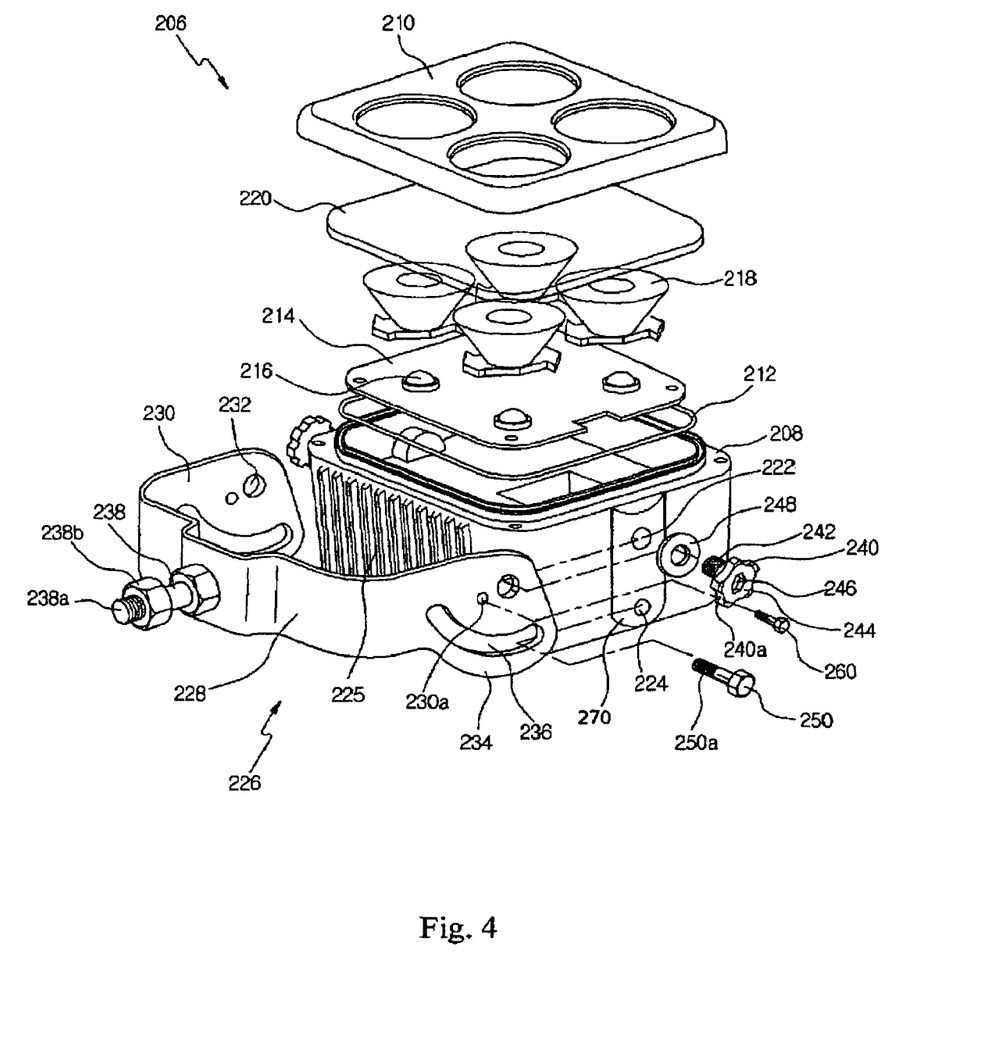
FIG. 4 is an exploded perspective view of an overhead lamp and supporting structure for a constructional vehicle according to an embodiment of the present invention.
Figure 5:
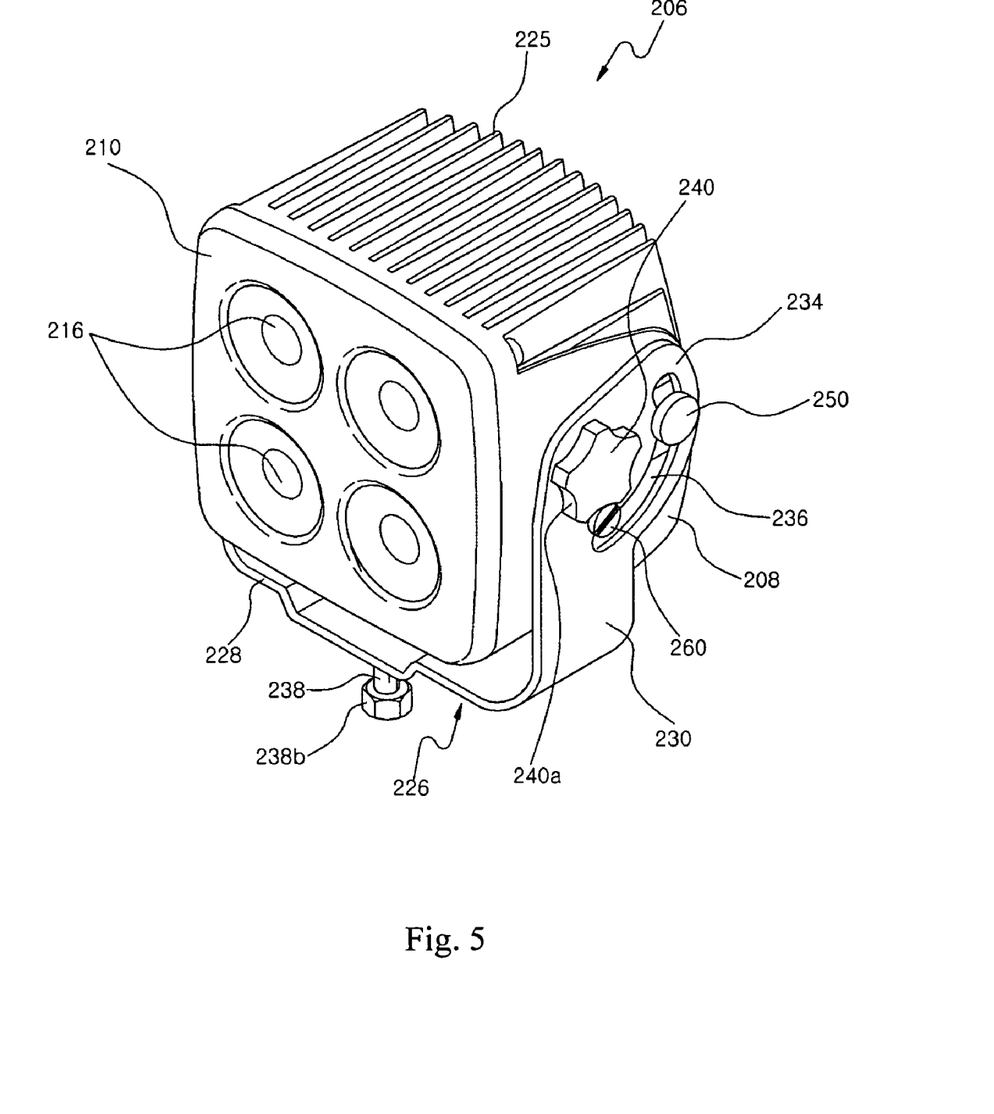
FIG. 5 is a perspective view of the overhead lamp and supporting structure for the constructional vehicle according to the embodiment of the present invention.
Figure 6:
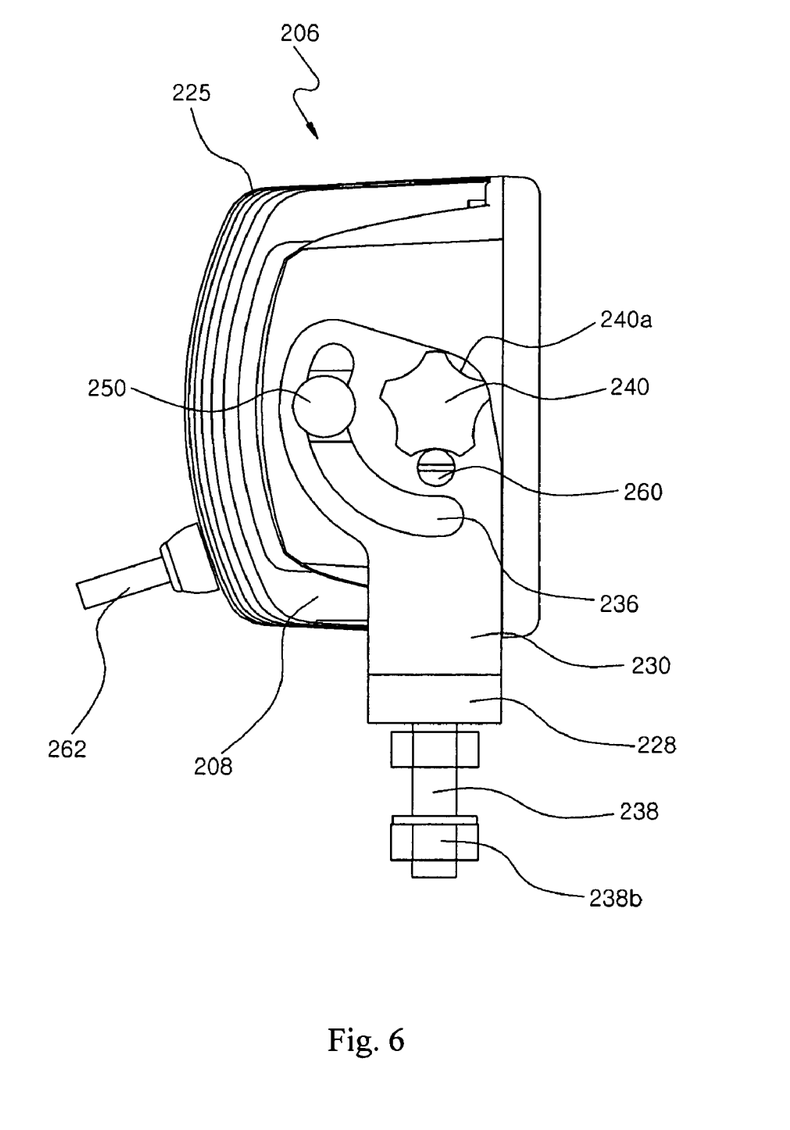
FIG. 6 is a side view of the overhead lamp and supporting structure of FIG. 5.

FIG. 4 is an exploded perspective view of an overhead lamp and supporting structure for constructional vehicle according to an embodiment of the present invention. FIG. 5 is a perspective view of the overhead lamp and supporting structure for constructional vehicle, according to the embodiment of the present invention. FIG. 6 is a side view of the lamp and supporting structure of FIG. 5.

Referring to the drawings, the overhead lamp structure according to the embodiment of the present invention, the position controlling slits are formed on lateral sides of a bracket so that the illumination angle range of the lamp apparatus can be increased. A main case of the lamp apparatus is supported by 4 points through pluralities of hinges and the position controlling slits. In addition, a fixing screw for fixing a hinge bolt not to be rotated is provided so that the main case of the lamp apparatus supporting structure can be securely fixed to the bracket.

More specifically, an overhead lamp apparatus 206 equipped with the lamp apparatus supporting structure comprises a main case 208 having a hexahedron form with an opened upper side. Additionally, the lamp apparatus comprises a plurality of LED lamps 216 mounted in the main case 208, a PCB 214 for the lamp apparatus, being equipped with parts and sockets for operating the LED lamps 216, a collimate lens 218 connected to a front side of the LED lamps 216 to reflect an illuminated light by a predetermined angle, and a protection board 220 formed at the front side of the collimate lens 218 to protect the LED lamps 216 from contaminants.

In addition, a cover 210 covering the front of the protection board 220 is connected to the front of the main case 208. A packing material 212 is interposed between the cover 210 and the main case 208.

The main case 208 has assembled with many different lamp parts, therein. A pivot point 222 and a fastening nut 224 are integrally formed on an arc-strip located at a center of both lateral sides of the main case 208. The main case 208 mounted between a pair of the lateral supporters 230 and fastened by a thread 242 on a knob-shaped fastener 240 is tilt-able with respect to the pivot point 222 and fix-able with respect to the fastening nut 224 and the fastening bolt 250. Therefore, the main case 208 has four point supporting system for tilting and fixing.

Additionally, the mounting unit (226) has a bolt hole (232) and an arch-shaped slot (236) on the lateral supporters (230). The bolt hole (232) is for passing through the thread (242) of the knob-shaped fastener (240) for mating to the pivot point (222). The fastening nut (224) is for installing the fastening bolt (250) through the arch-shaped slot (236) to slide and fix the main case (208). The mounting unit (226) is for mounting the main case (208) on a roof panel (4) of a heavy equipment vehicle (2).

A plurality of the heat emitting fins 225 are formed on the outer surfaces of the main case 208 to increase the heat emitting surfaces. The main case 208 is made of a high-conductivity material, which is aluminum. The heat emitting fins 225 are integrally formed at top, lower and rear surfaces of the main case 208 suitable for heat venting.

The lamp apparatus supporting structure according to the embodiment of the present invention further includes the knob-shaped fastener 240 for mounting the main case 208 to the mounting unit 226 in a hinged manner, and the fastening bolts 250 for fixing the main case 208 to the mounting unit 226 through the arch-shaped slot 236 to set a predetermined illumination angle.

Herein, the knob-shaped fastener (240) forms a thread (242) on a front bolt portion for inserting into the pivot point (222). The fastening bolt (250) is inserted to the fastening nut (224) for fixing an illumination angle after adjusting by sliding through the arch-shaped slot (236). Therefore, the main case (208) mounted on the mounting unit (226) is able to be tilted by loosening the knob-shaped fastener (240) and fixed by tightening the fastening bolt (250).

The mounting unit (226) comprises a center supporter (228) for mounting on the roof panel (4) of the vehicle (2) and a pair of the lateral supporters (230) disposed perpendicular to the center supporter (228) for installing the main case (208) by matching the bolt hole (232) to the pivot point (222) and thread (242) of the knob-shaped fastener (240). A tilt calibrator (234) is formed rearward of the arch-shaped slot (236) on both sides of the lateral supporters (230). The center supporter (228) has a mounting bolt (238) forming a male thread (238*a*) on the front portion for mounting on the roof panel (4) and a set of fastening nuts (238*b*).

The arch-shaped slot 236 is formed at the lateral supporters (230) for sliding the main case 208 through thereof rotating with respect to the pivot point 222 and fixed by fastening the bolts 250. Here, the illumination angle according to a rotational range of the main case 208 through the arch-shaped slot 236 is ±90 degrees.

More specifically, the arch-shaped slot 236 is cut-out in the arc form on the lateral supporters 230, by ¼ length of a circular circumference such that the angle of the main case 208 can be controlled between the front side and the vertical lower side. Therefore, when the fastening bolt 250 is fixed at the uppermost position of the arch-shaped slot 236, the main case 208 illuminates the front side. When the fastening bolt 250 is fixed at the lowermost position of the arch-shaped slot 236, the main case 208 illuminates the vertical lower side.

Especially, considering that the present invention is explaining the lamp apparatus supporting structure for the heavy equipment vehicle, the working position of the lamp apparatus supporting structure may be a front bottom surface or a front wall of the vehicle. Therefore, as the illumination angle range of the main case 208 is increased, convenience of the work is improved.

In addition, the center supporter 228 further includes a connection rod 238 formed at a lower central position, having a male screw thread 238*a* on an outer circumference thereof to be fixed to the roof panel 4, and a nut 238*b*.

According to the conventional lamp apparatus supporting structure for such a heavy equipment vehicle, the hinge bolt fastening lever 240 may be loosened and separated while the vehicle is running on a rough ground of the poor working environment. To this end, according to this embodiment, a connection screw 260 is provided to the side supporter 230 to prevent separation of the hinge bolt fastening lever 240 by being fitted with any one outer circumferential recess 240A of the hinge bolt fastening lever 240.

After the main case 208 is connected using the hinge bolt fastening lever 240 in a hinged manner, the connection screw 260 is fitted with the any one outer circumferential recess 240*a* of the hinge bolt fastening lever 240 and then connected with the connection hole 230*a* formed at the side supporter 230. In this state, the hinge bolt fastening lever 240 can be prevented from being separated.

Hereinafter, the function and operation of the lamp apparatus supporting structure according to the embodiment of the present invention will be described in detail with reference to the accompanying drawings.

First, to fix the lamp apparatus 206 to the roof panel 4 of the heavy equipment vehicle, the penetration hole 232 of the side supporter 230 of the fixing unit 226 is corresponded to the hinge hole 222 formed on both sides of the main case 208 and then hinge-connected using the hinge bolt fastening lever 240. Accordingly, the main case 208 is hinged on the fixing unit 226 by the hinge bolt 242 formed at the front end of the hinge bolt fastening lever 240, thereby enabling the main case 208 to rotate about the hinge bolt 242 of the fixing unit 226.

The hinge bolt 242 formed at the front end of the hinge bolt fastening lever 240 has male screw threads along the outer circumference thereof. In addition, the hinge bolt fastening lever 240 may further include a wrench hole 246 in the center thereof so as to be rotated by a wrench.

In this state, the fixing unit 226 is connected to the upper surface of the roof panel 4 using the nut 238*b* and the connection rod 238 formed in the lower central surface of the fixing unit 226.

Therefore, the lamp apparatus 206 for the vehicle can be fixed to the roof panel 4. In order to more securely fix the hinge bolt fastening lever 240 and prevent separation of the hinge bolt fastening lever 240, the connection screw 260 is fitted with the any one outer circumferential recess 240*a* of the hinge bolt fastening lever 240 and the connection screw 260 is connected with the connection hole 230*a* of the side supporter 230.

The illumination angle range of the lamp apparatus 206 can be controlled by the operator. More specifically, the operator may hold an angle controlling bar 262 and rotate the main case 208 by a predetermined angle relative to the fixing unit 226, while unfastening the fixing bolt 250 connected to the fixing recess 224 through the position controlling slit 236 while maintaining a rotatable state of the main case 208 with respect to the fixing unit 226. Next, by fastening the fixing bolt 250 to the fixing recess 224, the fixing bolt 250 can be securely fastened to the fixing recess 224, passing through the position controlling slit 236, thereby fixing the main case 208 by the predetermined angle with respect to the fixing unit 226.

In this state, since the position controlling slit 236 is in the arc form having ¼ length of a circular circumference, the main case 208 can be rotated by 90 degrees with respect to the fixing unit 226. Accordingly, the LED lamps 216 can be freely moved within the controllable angle range, that is, between the front side and the vertical lower side. Especially in the working environment for the heavy equipment vehicle, it is more advantageous when the LED lamps 216 have a great illumination angle. In this regard, the position controlling slit 236 of this embodiment is desirable since having such a relatively long length.

Therefore, when the LED lamps 216 are turned on, the LED lamps 216 can light up the front side of the heavy equipment vehicle 2 by the predetermined illumination angle. Here, according to the above-structured lamp apparatus 206, since the position controlling rib 234 including the position controlling slit 236 is extended rearward from the side supporter 230 and provided on both sides of the fixing unit 226, the position controlling slit 236 can be formed long enough to increase the illumination angle.

Moreover, the main case 208 fixed to the fixing unit 226 through the plurality of position controlling slits 236 can be more securely fixed by the 4-point supporting system. Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A structure of overhead lamp and mounting bracket including a plurality of LED lamps mounted in a main case, a lamp PCB for mounting and operating the LED lamps, a collimating lens connected to a front side of the LED lamps to reflect light at a predetermined angle, a protection board formed at the front side of the collimating lens to protect the LED lamps from contaminants, a cover connected to the front of the main case for covering the protection board and a packing material interposed between the cover and the main case, the overhead lamp and mounting bracket comprising:

the main case (208) having a four point supporting system for tilting and fixing the main case, wherein the main case (208) is tilt-able with respect to a pivot point (222) and fix-able with respect to a fastening nut (224), wherein the pivot point (222) and the fastening nut (224) are integrally formed on an arc-strip located at a center of both lateral sides of the main case, a mounting unit (226) having a bolt hole (232) and an arc shaped slot (236) for passing through a thread (242) and a threaded bolt (250a) to insert into the pivot point (222) and the fastening nut (224), respectively for mounting the main case (208) on a roof panel of a heavy equipment vehicle, a knob-shaped fastener (240) forming the thread (242) on a front bolt portion thereof for installing and tilting the main case (208) on the mounting unit (226), and a fastening bolt (250) positioned in the arc shaped slot for adjustably fixing an illumination angle of the lamp by tilting the main case (208) slidably along the arch-shaped slot (236), wherein the mounting unit (226) comprises: a center supporter (228) mounted on the roof panel (4) of the vehicle (2); a pair of lateral supporters (230) perpendicular to the center supporter (228) for installing the main case (208) by matching the bolt hole (232) to the pivot point (222); and a tilt calibrator (234) formed rearward of the arch-shaped slot (236) on both sides of the lateral supporters (230), wherein said center supporter (228) has a mounting bolt (238) with a male thread (238*a*) on the front portion and a set of fastening nuts (238*b*) for mounting on the roof panel (4).

2. The structure of overhead lamp and mounting bracket according to claim 1, wherein the main case (208) comprises a plurality of heat emitting fins (225) formed on an outer surface of the main case (208) to increase heat emitting surfaces.

3. The structure of overhead lamp and mounting bracket according to claim 1, wherein the main case (208) is made of a high-conductivity material, which is aluminum.

4. The structure of overhead lamp and mounting bracket according to claim 1, wherein the arch-shaped slot (236) has a quarter circular length on both of the lateral supporters (230) formed by cutting.

5. The structure of overhead lamp and mounting bracket according to claim 1, wherein the main case (208) is rotated 90° for illuminating by tilting along the arch-shaped slot.

6. The structure of overhead lamp and mounting bracket according to claim 1, wherein the mounting unit (226) has a U-shape to install the main case (208) therein.

7. The structure of overhead lamp and mounting bracket according to claim 1, wherein the knob shaped fastener (240) further comprises a stop-bolt (260) inserted into an install hole (230*a*) on the mounting unit (222) for contacting a recess (240*a*) of the knob-shaped fastener (240) to prevent free rotation and loosening of the knob-shaped fastener (240).

8. The structure of overhead lamp and mounting bracket according to claim 2, wherein the heat emitting fins (225) are integrally formed at a top surface, a lower surface and a rear surface of the main case (208) for heat venting.

\* \* \* \* \*